Aug. 18, 1936.  M. N. STATES  2,051,320
APPARATUS FOR USING PHOTOELECTRIC CELLS QUANTITATIVELY
Filed July 2, 1934  2 Sheets-Sheet 1
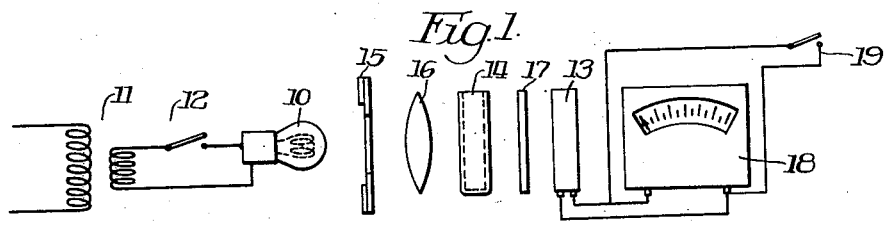
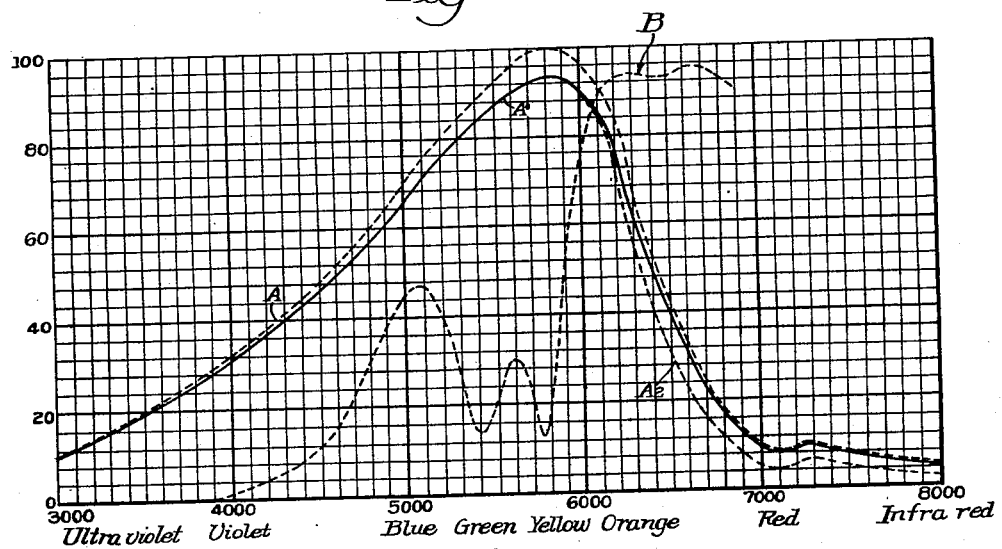
Inventor:
Marshall N. States
By Allison, Mann & Cox, Attys

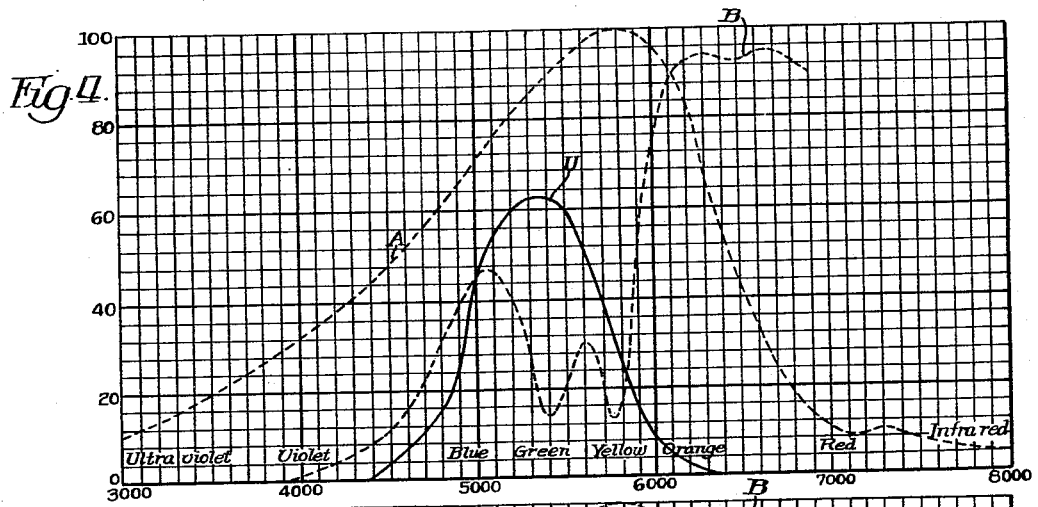
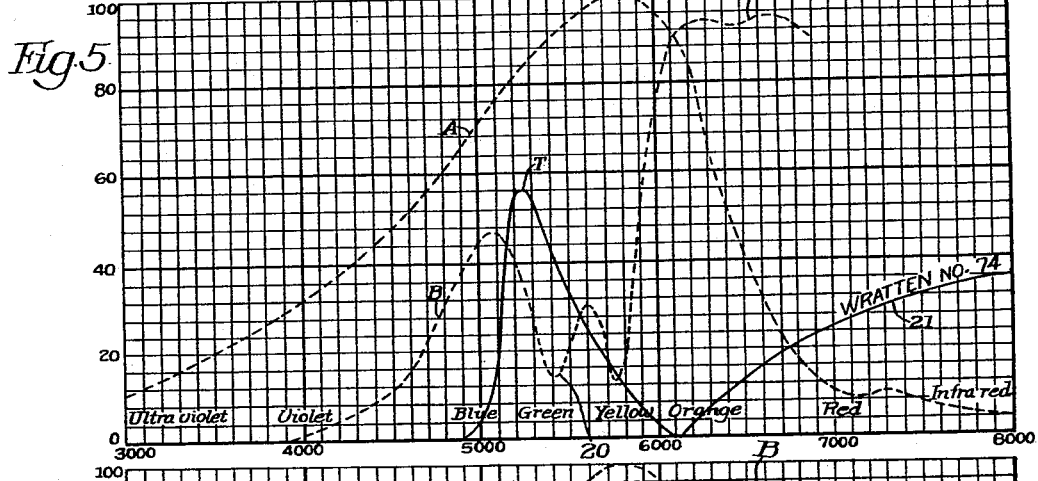
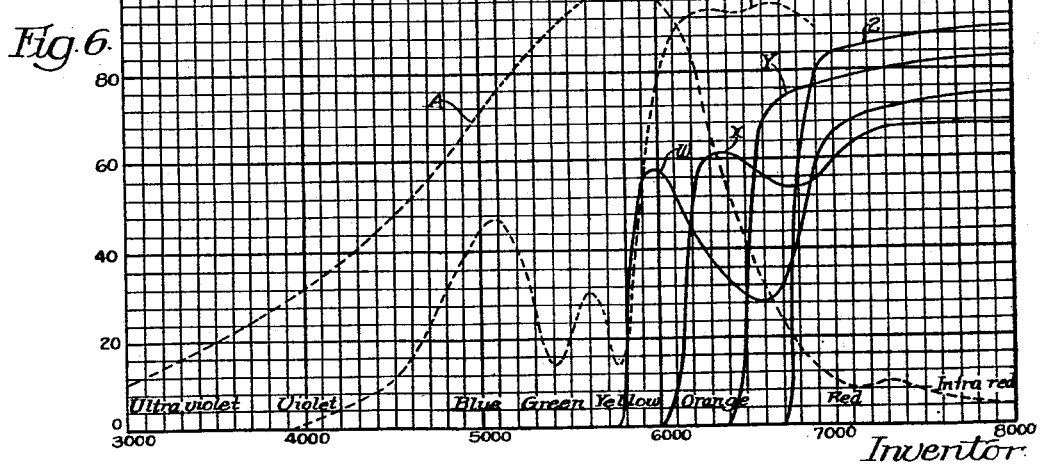

Patented Aug. 18, 1936

2,051,320

UNITED STATES PATENT OFFICE 2,051,320

APPARATUS FOR USING PHOTOELECTRIC CELLS QUANTITATIVELY

Marshall N. States, Evanston, Ill., assignor to Central Scientific Company, a corporation of Illinois Application July 2, 1934, Serial No. 733,356

11 Claims. (Cl. 88—14)

The principal object of this invention is to obtain uniformly accurate results when employing photoelectric cells quantitatively, so that results once obtained can be subsequently reproduced.

Further objects and advantages will become apparent as the disclosure proceeds and the description is read in conjunction with the accompanying drawings, in which Fig. 1 is a diagrammatic representation of apparatus which may be used in quantitative work utilizing the invention; and Figs. 2 through 6 inclusive are graphs which will be used to explain the principles which are believed to underlie the invention.

At the outset, it will be helpful to analyze briefly the theory which is believed to underlie the present invention, although all theoretical discussions in this specification are to be construed not as defining a mode of operation, but merely as a possible explanation of certain physical and electrical phenomena known to exist.

In general, photoelectric cells are divided into three classes: The photo-resistive type, the photo-emissive type, and the photo-voltaic type. Selenium cells are typical of the first class, and their operation is based upon the fact that the electrical resistance of selenium is functionally related to the intensity of the light falling upon the cell. In the photo-emissive cell, such light sensitive substances as sodium, potassium, or caesium are placed in series with an electromotive force, and light falling upon these substances has the effect of ejecting electrons from the surface of the metal in such manner that the total current through the circuit is functionally related to the intensity of the light falling upon the cell. The photo-voltaic cell is a more recent development and it converts light energy into electrical energy directly without the assistance of an external electromotive force. The light sensitive substance generally used is copper oxide and when light falls upon this material, an electromotive force is generated which is a function of the intensity of light falling upon the cell.

The present invention is concerned primarily with the latter type of photoelectric cell, although all photoelectric cells, of whatever type, which exhibit the property of what for convenience will be termed selective fatigue, will be deemed to be within the scope of this invention.

For the purpose of disclosure, the invention will be discussed in its particular application to a Weston photronic cell, this cell being of the photo-voltaic type and manufactured by the Weston Electrical Instrument Corporation, Newark, New Jersey. The cell consists of a thin metal disk to which a coating of copper oxide is applied. The copper oxide forms a positive terminal and a metal collector ring in contact with the light sensitive surface forms a negative terminal. The cell is enclosed in a suitable housing and has a window through which light is admitted to the cell. For convenience, the Weston cell will be hereinafter referred to as a photronic cell.

The photronic cell is responsive to light waves ranging from the ultra-violet to the infra red with maximum response occurring at approximately 5800 angstroms. The dotted line curve marked A in Figs. 2-6 inclusive, may be called the spectral response curve of a photronic cell, the curve being plotted with wave lengths as abscissas, and percentages of maximum cell response as ordinates. A uniform distribution of energy among the various wave lengths is used in obtaining the curve.

Stated in other words, the spectral response curve A represents average relative current output for equal energy rates at various parts of the spectrum.

Photronic cells, as well as other photoelectric cells, are known to have a characteristic called "fatigue" which may be described as a falling off of reaction to light for a given period after the cell has been exposed. In other words, if the total current produced by a photronic cell when first exposed to a source of constant light is 20 micro-amperes, it will be found that the current will gradually diminish to perhaps 17 micro-amperes over a period of forty or fifty minutes (the length of time, of course, depending upon the light intensity) after which the current remains quite constant. It has generally been considered that this property of fatiguing is uniform for all wave lengths, but I have found that this is not true, and that certain portions of the cell's spectral response fatigue non-uniformly. This non-uniformity may be termed "selective fatigue" for it applies to certain bands of wave lengths.

The erratic behavior of photronic cells during the fatiguing process may best be demonstrated by the data furnished by observation when the photronic cell is used in an apparatus known as a "Photelometer", manufactured by the Central Scientific Company of 460 E. Ohio Street, Chicago, Illinois, and used for the purpose of quantitatively measuring the transparency of given specimens of material.

The apparatus is diagrammatically shown in Fig. 1 and comprises a light source 10 which may take the form of an incandescent bulb supplied with current by a constant voltage transformer 11, a switch 12 being provided to turn the light source on or off as desired. As will be explained later, a monochromatic light source may be employed in certain adaptations of this invention and even polychromatic light sources may be used, provided certain wave lengths are avoided.

The light source is directed upon a photronic cell, indicated at 13, and the specimen to be tested is placed in a container 14, which is interposed in the path of light. An iris diaphragm 15 enables the quantity of light to be adjusted, and a lens 16 concentrates the light waves into a beam of parallel rays. If the light source 10 emits light waves which fall within the bracket that are known to produce selective fatigue in the cell, a light filter 17 is employed to screen out such waves. A galvanometer 18 which may be shunted out the circuit by a switch 19 indicates the current produced by the light falling on the cell 13.

Before placing a specimen in the container 14, it is necessary to obtain a standard with which the transmission of a specimen may be compared. Assuming that the specimen to be tested is one which dissolves in water, for example, oxy-hemoglobin, a standard is obtained by placing distilled water in the container 14 and adjusting the iris diaphragm 15 until a reading of say 100 is recorded by the galvanometer. If, now, specimens of oxy-hemoglobin of unknown concentration are placed in the container 14, the galvanometer will record for each specimen its relative concentration.

It will be understood that before any reading of relative concentration or transparency is taken with the galvanometer, it is always necessary (except when cell fatigue has disappeared) to first obtain what will hereafter be termed a standard setting by adjusting the iris diaphragm 15 until the galvanometer has a predetermined standard deflection, say 100, using a standard substance, usually the solvent of the substance under test, in the container 14.

Greater accuracy in ascertaining relative concentrations may be obtained if filters are employed with the apparatus to absorb at least a large part of the light waves which do not correspond to a characteristic absorption band of the substance under test. For example, it is known that oxy-hemoglobin has a characteristic absorption curve substantially as shown by the curve B in Figs. 2–6 inclusive. The curve shows that oxy-hemoglobin has at least three absorption bands, one in the vicinity of 4000 angstroms, one at about 5400 angstroms, and one at a wave length of approximately 5750 angstroms. Therefore, in order to obtain the greatest possible changes in current for differences in concentration, light filters having maximum transmission at wave lengths corresponding to the characteristic absorption bands of oxy-hemoglobin should be used.

It would ordinarily be presumed that the absorption band having the narrowest range of wave lengths should be used providing a filter is available which has a corresponding transmission band also of narrow range. It so happens, however, that many filters having appropriate transmission bands to match the chosen absorption band of the substance under test, have in addition other transmission bands which for reasons later explained, produce inaccuracies in readings.

The point may best be illustrated by observed results. In Fig. 5, the relative spectral response of the photoelectric cell is indicated by the curve A, the absorption curve of oxy-hemoglobin, at B, and the characteristic curve of a filter, known as Wratten filter No. 74, at T, this filter being made by the Eastman Kodak Company of Rochester, New York. This filter has a maximum transmission at approximately 5250 angstroms which corresponds substantially to the so-called Beta absorption band, indicated at 20, of oxy-hemoglobin. Although the manufacturers of this filter do not indicate in their tables any transmission in red beyond 6100 angstroms, it has been shown by observation that there is considerable transmission beyond 6100 angstroms. This transmission is indicated by the portion 21 of the characteristic transmission curve for the filter (Fig. 5).

Experience has shown that results obtained with the use of Wratten filter No. 74 are not constantly reproducible when readings are taken within a period of approximately one hour after the photronic cell has been subjected to an inintensity of approximately two foot candles. For example, let us assume in Fig. 1, that the container 14 is filled with distilled water and that the Wratten filter No. 74 is used at 17. Let us further assume that the incandescent source of light at 10 has been allowed to fall on the photronic cell 13 for a very short time, say a few seconds, and that the iris diaphragm 15 has been adjusted so that the needle of the galvanometer 18 registers 100. If now a specimen of oxy-hemoglobin of known concentration is placed in the container 14, the galvanometer needle will fall to some lower value say 37. However, in forty-five seconds, if the same test is made (first, of course, obtaining a standard setting), it will be found that the galvanometer reading has increased to 37.2. Similarly, after two minutes, the test will show the galvanometer to read 38; at four minutes, the galvanometer will read 38.2; and it is not until some forty or fifty minutes later that reproducible results are obtained with galvanometer readings at 40.

Now let us replace Wratten filter No. 74 with a filter U having a transmission curve such as shown in Fig. 4. It will be observed that this filter has a maximum transmission at approximately 5300 angstroms (very closely corresponding to the maximum transmission of Wratten filter No. 74) and that it has no transmission over 6400 angstroms. When this filter is used in testing the concentration of oxy-hemoglobin, it has been found that the readings on the galvanometer are always the same regardless of the length of time during which the light source has thrown light waves on the photronic cell. This, of course, assumes that before each reading, the galvanometer is set at 100, using distilled water in the specimen cell 14.

The same reliability of observation is obtained if a filter V is used, having a transmission curve such as shown in Fig. 3. This filter has maximum transmission in the violet blue portion of the spectrum (approximately 4350 angstroms) and has but a very slight amount of transmission in the red, as indicated by the portion 22 of the curve.

It has long been known that photoelectric cells undergo a fatiguing process when subjected to light waves over a period of time. The length of time during which this process continues is more or less dependent upon the characteristics of the cell and upon the intensity of the light falling upon the cell. It has been assumed that the fatiguing process uniformly affects the entire spectral response of the cell, but the observations which have been noted above indicate that this is not true. It appears now that certain wave lengths produce abnormal fatigue in a photoelectric cell, and results obtained from many experiments indicate that this abnormality, at least in photronic cells, occurs particularly in the red and infra red portions of the spectrum.

To explain further, let us assume that a given photoelectric cell produces a current $I_1$ when first exposed to a constant source of light and that this current is produced by a given spectral distribution $R_1$ of cell response. If, at any time during the fatiguing process, the current produced by the cell is adjusted back to $I_1$ (as by increasing the amount of light flux falling on the cell), and if such readjustment of the current results in the same spectral distribution of cell response $R_1$, the cell is said to fatigue uniformly. On the other hand, if a different spectral distribution of cell response $R_2$ results from the readjustment of light flux to produce current $I_1$, the cell is said to exhibit selective fatigue.

Referring to Fig. 2, an attempt has been made to illustrate this abnormal or selective fatigue in a photronic cell. As stated before, the curve A represents the relative spectral response of a photronic cell, and for the purposes here, it will be assumed to represent the response at the instant when the light first falls upon the cell. The total current produced by the cell at this instant is the integrated effect produced by light of all wave lengths falling on the cell. Assuming an incandescent source of light of constant intensity, the total current produced by the cell at a given instant may be obtained by integrating the area under a curve somewhat similar to curve A, as shown in Figs. 2–6 inclusive in which the ordinates are defined by the equation:

$$I = K \int_{\lambda_2}^{\lambda_1} y\, d$$

in which I is the current, $y$ is the ordinate, $\lambda$ is the abscissa and K is a proportionality factor.

If the cell fatigued uniformly throughout its entire spectral response, the condition of the cell at a given time $t$ may be represented by the full line curve $A_1$, for which all values of ordinates are proportionally less than the corresponding ordinates of the curve A, but results indicate that somewhere in the vicinity of 6000 angstroms, the rate of fatigue is either more or less than the normal rate as determined by the lower wave lengths and for the purpose of illustration, this non-uniform rate above 6000 angstroms may be indicated by the dotted line curve $A_2$.

If this relation is true and the observed results would seem to substantiate it, it is necessary, if the effects of selective fatigue are to be avoided, to choose filters when making quantitative tests so that substantially all wave lengths which fall within the ranges of selective fatigue are eliminated.

It will be understood that except for the spectral response curve A in which the ordinates represent the relative percentage of cell response, the vertical scale for the other curves is arbitrary and represents relative transmission, but for any one of these curves, the relative values of transmission are as indicated.

That certain filters transmit red and others do not is easily proven by using them in conjunction with filters which are known to transmit only in the red and infra red regions. If the combination of filters transmits light, it necessarily follows that the transmission bands of the two filters overlap. Quantitative results in combining such filters are shown in the following chart which assumes a uniform intensity of light on the filters (the values given representing percentages of the initial intensity which is transmitted by the combinations):

|   | T | U | V |
|---|---|---|---|
| W | 15.2 | 2.5 | 0 |
| X | 7 | 0 | 0 |
| Y | 12 | 0 | 0 |
| Z | 14 | 0 | 0 |

Obviously, it is possible to eliminate undesirable wave lengths by other means than filters. For example, prisms, gratings, or equivalent means may be used to break up the light source into its component parts, or the light source itself may be chosen so that the undesirable wave lengths are avoided, or if present are so weak in energy as to be unproductive of selective fatigue.

From the foregoing discussion, one can find a possible explanation of the various readings obtained when filter T is employed in making quantitative tests, whereas uniform and reproducible readings are obtained when filters such as U and V are used. It is obvious that when filter T is being used in making a standard setting, the current delivered by the cell in producing the standard deflection arises from light energy in the main transmission band of the filter at about 5250 angstroms, and in addition the light energy which the filter passes in the red and infra red regions of the spectrum. When the substance under test is interposed in the light path, the resultant lower reading recorded by the galvanometer is due to the absorption of energy by the substance under test not only in the characteristic absorption band of the substance, but also in the red and infra red regions of the spectrum.

As the cell fatigues, the opening in the iris diaphragm 15 must be increased when making standard settings in order to obtain standard deflection. Since the fatiguing process is non-uniform (and as a consequence the spectral distribution of cell response is changing) the light energy in the main transmission band (as distinguished from that in the red and infra red) bears a different relation to the current produced by the cell than it did previously (or is effective to a more or less extent in producing the cell current than it was) and consequently when the substance under test is introduced in the light path, the readings obtained are variable and are not reproducible until such time as the cell has been completely fatigued and the spectral distribution of cell response becomes constant.

Inasmuch as the shifting distribution of light energy in the red and infra red portions of the spectrum appears to be the cause of the non-uniform results obtained when using filter T, it naturally follows that when filters such as U and V are used which do not transmit light waves in the portion of the spectrum wherein the photronic cell exhibits selective fatigue, the distribution of light energy remains constant even during the fatiguing process and consequently reproducible results may be obtained during this period of operation.

One distinct advantage in eliminating red and infra red from the light falling upon a photronic cell, particularly when an incandescent source is used, resides in the fact that slight variations in the voltage across the lamp do not produce appreciable error in galvanometer readings. With red and infra red waves falling on the photronic cell, voltage chances even of very light magnitude produce sizable error in galvanometer readings.

Another advantage resulting from the practice of this invention is that greater differences in galvanometer readings are obtained for differences in the transparency of specimens when the light waves falling on the cell are restricted to those corresponding to a characteristic absorption band of the substance under test. The method and apparatus of this invention, therefore, not only increase the accuracy with which readings are obtained, but also the sensitivity of measurements. For example, in the measurement of oxy-hemoglobin, the sensitivity of the apparatus over its useful range is increased 27% when filter U is substituted for filter T.

While the invention has been disclosed as particularly applicable to quantitative measurement, it also has its application to qualitative work where identification of substances is predicated upon characteristic absorption curves.

What I claim is:—

1. Apparatus for determining quantitatively the transparency of a given specimen comprising a photovoltaic cell, a light source directed upon the cell, a current indicator in circuit with the cell, means for placing the specimen in the path of the light waves travelling from the light source to the cell, and means between the light source and the cell for eliminating substantially all red and infra-red light waves whereby the tendency of the cell to fatigue nonuniformly is substantially avoided.

2. Apparatus for determining quantitatively the transparency of a given specimen comprising a photoelectric cell of the photo-voltaic type, a light source directed upon the cell, a current indicator in circuit with the cell, means for placing the specimen in the path of the light waves directed upon the cell, and a filter interposed in the light path between the light source and the cell capable of absorbing red and infrared waves whereby the tendency of the cell to fatigue nonuniformly is substantially avoided.

3. Apparatus for determining quantitatively the transparency of a given specimen comprising a photoelectric cell of the photo-voltaic type, a light source directed upon the cell, a current indicator in circuit with the cell, means for placing the specimen in the path of the light waves directed upon the cell, and a filter interposed in the light path between the light source and the cell having a transmission band in the blue portion of the spectrum and absorbing substantially all red and infra-red waves whereby the tendency of the cell to fatigue nonuniformly is substantially avoided.

4. In a measuring instrument employing a photo-voltaic photoelectric cell of the type which exhibits selective fatigue, the combination with said cell of means for directing light on the cell that is substantially devoid of light rays over 6000 angstroms whereby the tendency of the cell to fatigue non-uniformly is substantially avoided.

5. In a measuring instrument, a photoelectric cell having a light sensitive element composed of copper oxide, a light source directing light waves on the cell, and means for eliminating all light waves above 6000 angstroms from light cast upon the cell whereby the tendency of the cell to fatigue nonuniformly is substantially avoided.

6. In combination, a photo-voltaic photoelectric cell having selective fatigue for a given portion of its spectral response, a light source directed upon the cell, and means for absorbing all light waves from said source which lie within the portion of the spectrum wherein the cell exhibits selective fatigue.

7. In a measuring instrument, a photo-electric cell of the photo-voltaic type, a light source directing light waves on the cell, and a filter placed in the light path, having maximum transmission between 3500 angstroms and 6000 angstroms and being substantially opaque to light waves over 6000 angstroms whereby the tendency of the cell to fatigue nonuniformly is substantially avoided.

8. In an analytical instrument, a photo-voltaic photoelectric cell having selective fatigue for a given portion of its spectral response, means for directing light waves on the cell that are devoid of waves which lie within the portion of the spectrum wherein the cell exhibits selective fatigue, and means for adjusting the intensity of the light to offset normal fatigue.

9. Apparatus for determining quantitatively the concentration of oxy-hemoglobin in a given specimen comprising a self-energizing photoelectric cell which exhibits the property of selective fatigue, a source of light directed upon the cell, means for placing the specimen in the path of the light waves travelling from the light source to the cell, and a filter also interposed in said light path having a maximum transmission between 4000 and 5000 angstroms, said filter being substantially opaque to red and infra-red light waves whereby the tendency of the cell to fatigue nonuniformly is substantially avoided.

10. In an analytical instrument, a photo-voltaic photoelectric cell having selective fatigue for a given portion of its spectral response, and means for directing light waves on the cell that are substantially devoid of waves which lie within the portion of the spectrum wherein the cell exhibits selective fatigue.

11. In combination, a photoelectric cell of the photo-voltaic type having selective fatigue for a given portion of its spectral response, and filtering means associated with the cell for excluding from the cell substantially all light waves which lie within the portion of the spectrum wherein the cell exhibits selective fatigue, whereby the tendency of the cell to fatigue non-uniformly is substantially eliminated.

MARSHALL N. STATES.